United States Patent
Masuda (10) Patent No.: US 9,840,237 B2
(45) Date of Patent: Dec. 12, 2017

(54) ELECTRIC BRAKE SYSTEM

(71) Applicant: NTN CORPORATION, Osaka (JP)

(72) Inventor: Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/759,423

(22) PCT Filed: Jan. 6, 2014

(86) PCT No.: PCT/JP2014/050016
§ 371 (c)(1),
(2) Date: Jul. 7, 2015

(87) PCT Pub. No.: WO2014/109298
PCT Pub. Date: Jul. 17, 2014

(65) Prior Publication Data
US 2015/0360656 A1    Dec. 17, 2015

(30) Foreign Application Priority Data

Jan. 8, 2013   (JP) ................................ 2013-000994

(51) Int. Cl.
*B60T 8/17*    (2006.01)
*B60T 7/04*    (2006.01)
(Continued)

(52) U.S. Cl.
CPC .................. *B60T 8/17* (2013.01); *B60T 7/04* (2013.01); *B60T 7/042* (2013.01); *B60T 13/741* (2013.01);
(Continued)

(58) Field of Classification Search
CPC .......... B60T 13/741; B60T 7/04; B60T 7/042; F16D 65/18
(Continued)

(56) References Cited

U.S. PATENT DOCUMENTS 6,003,640 A * 12/1999 Ralea ................... B60T 8/1703
188/1.11 L
8,230,983 B2 * 7/2012 Bailey ................... B60T 13/74
188/1.11 E
(Continued)

FOREIGN PATENT DOCUMENTS

EP    2 444 293    4/2012
FR    2699486    6/1994
(Continued)

OTHER PUBLICATIONS

European Search Report issued Dec. 21, 2015 in corresponding with European Application No. 14 73 8019.
(Continued)

*Primary Examiner* — Bradley King
*Assistant Examiner* — San Aung
(74) *Attorney, Agent, or Firm* — Wenderoth, Lind & Ponack, L.L.P.

(57) ABSTRACT

An electric brake system includes an electric brake having a friction pad which is pressed against a brake disk by an electric motor, and a controller. The controller is configured to receive detection outputs from a load detector for detecting a load applied to the brake disk, the brake pedal, and a vehicle speed detector, and to control the electric motor based on the outputs received. In particular, when the vehicle speed detector detects that the vehicle is at a stop, the controller compares the outputs of the brake pedal and of the load detector. If the difference therebetween, if any, is within the width of a dead band, the controller does not change, and thus maintains, the braking load even if the brake pedal is operated.

7 Claims, 10 Drawing Sheets

(51) Int. Cl.
    *B60T 13/74* (2006.01)
    *F16D 65/18* (2006.01)
    *F16D 121/24* (2012.01)
    *F16D 125/40* (2012.01)
    *F16D 125/48* (2012.01)
    *F16D 125/50* (2012.01)

(52) U.S. Cl.
    CPC .......... *F16D 65/18* (2013.01); *F16D 2121/24* (2013.01); *F16D 2125/40* (2013.01); *F16D 2125/48* (2013.01); *F16D 2125/50* (2013.01)

(58) Field of Classification Search
    USPC ......................................................... 188/162
    See application file for complete search history.

(56) References Cited

U.S. PATENT DOCUMENTS

| | | | |
|---|---|---|---|
| 2003/0125863 A1* | 7/2003 | Tamasho | B60T 13/741 701/70 |
| 2005/0269872 A1* | 12/2005 | Ralea | B60T 8/00 303/20 |
| 2008/0071456 A1 | 3/2008 | Shiraki | |
| 2008/0110704 A1 | 5/2008 | Nakazeki | |
| 2008/0283346 A1* | 11/2008 | Ralea | B60T 8/00 188/156 |
| 2012/0100958 A1 | 4/2012 | Oue et al. | |

FOREIGN PATENT DOCUMENTS

| | | |
|---|---|---|
| FR | 2835896 | 8/2003 |
| JP | 06-327190 | 11/1994 |
| JP | 2001-063537 | 3/2001 |
| JP | 2004-142514 | 5/2004 |
| JP | 2005-88787 | 4/2005 |
| JP | 2005088787 A * | 4/2005 |
| JP | 2006-194356 | 7/2006 |
| JP | 2007-015602 | 1/2007 |
| JP | 2010-111230 | 5/2010 |
| JP | 2011-079465 | 4/2011 |

OTHER PUBLICATIONS

International Search Report dated Apr. 8, 2014 in International (PCT) Application No. PCT/JP2014/050016.
Written Opinion of the International Searching Authority dated Apr. 8, 2014 in International (PCT) Application No. PCT/JP2014/050016 (with English translation).
Notification of Reasons for Refusal issued Nov. 22, 2016 in Japanese Application No. 2013-000994, with partial English translation.

* cited by examiner

ELECTRIC BRAKE SYSTEM

TECHNICAL FIELD

This invention relates to an electric brake system which consumes less electric power.

BACKGROUND ART

Electric brakes of the type in which a friction pad is pressed against a brake disk by an electric motor to apply a brake are disclosed e.g. in the below-identified Patent documents 1 and 2.

These electric brakes include a linear motion mechanism for converting the rotation of the electric motor to a linear motion. To covert rotation to a linear motion, the linear motion mechanism includes e.g. a ball-screw mechanism (as disclosed in Patent document 1) or a planetary reduction gear mechanism (as disclosed in Patent document 2).

In order to control the braking force, it is necessary to provide such an electric brake with a load detecting sensor.

Figure 1:
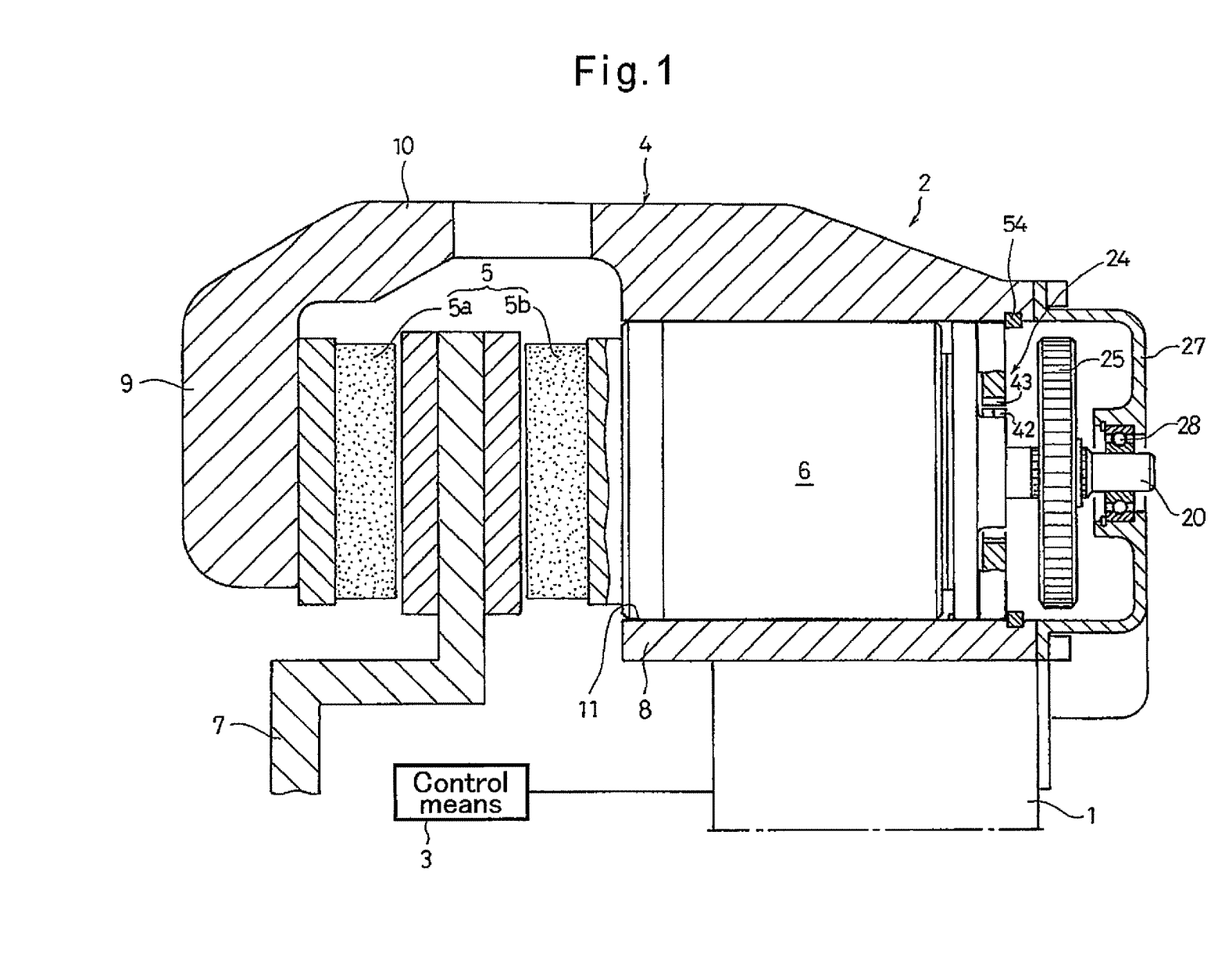
FIG. 1 is a block diagram of an embodiment.
Figure 4:
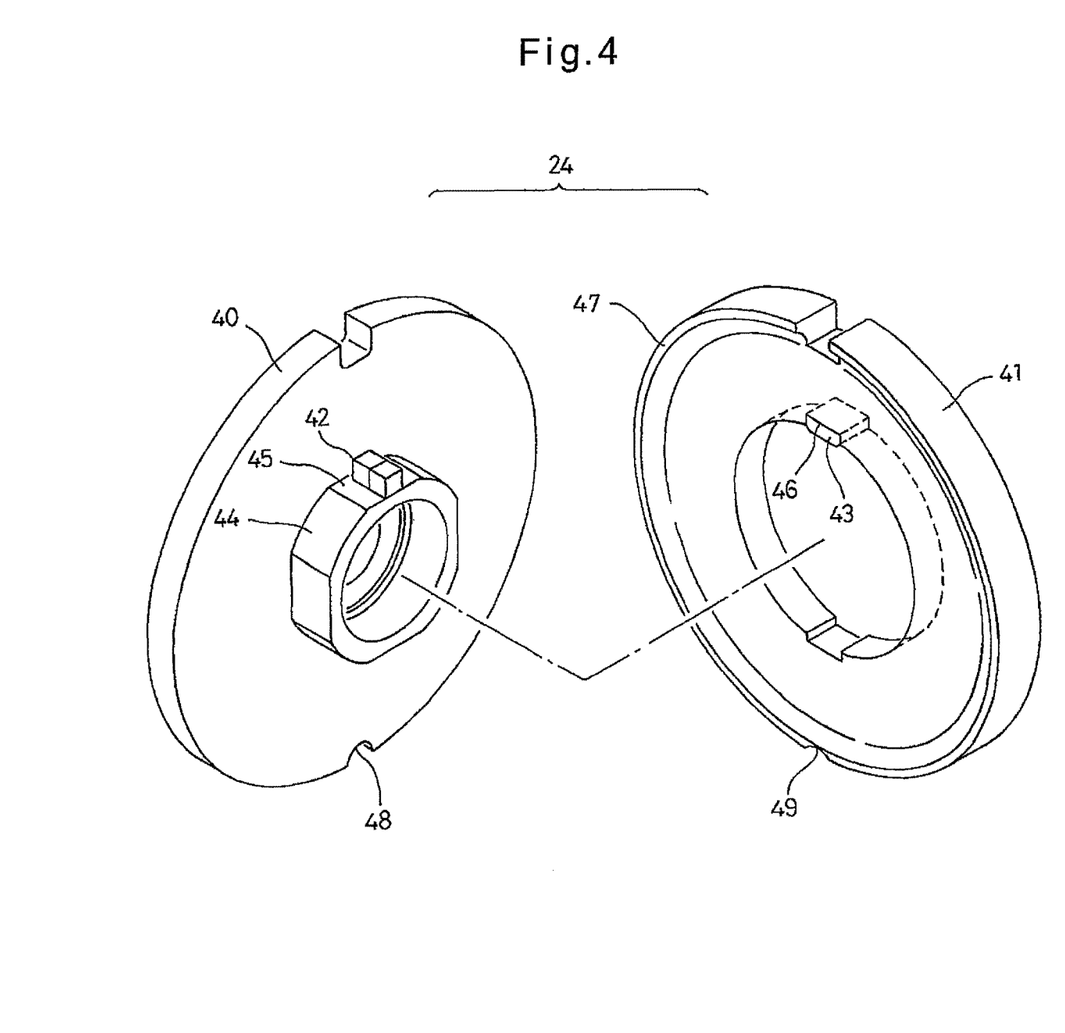
FIG. 4 is an exploded perspective view of a magnetic load sensor.

Such a load detecting sensor is described with reference to a magnetic load sensor 24 used in an electric brake 2 shown in FIG. 1, which embodies the present invention. The magnetic load sensor 24 includes a load detection sensor in the form of a magnetic load sensor 24. As shown in FIGS. 1 and 4, the magnetic load sensor 24 includes a flange member 40 and a support member 41 which are in the form of annular plates axially spaced apart from and axially facing each other, a magnetic target 42 which generates a magnetic field, and a magnetic sensor element 43 capable of detecting a magnetic field. The support member 41 is mounted on a rotary shaft 20 at a position axially rearwardly of the flange member 40. The magnetic sensor element 43 and the magnetic target 42 face each other in a direction perpendicular to the rotary shaft 20.

As a result, when a friction pad 5 is pressed against a brake disk 7 by a linear motion mechanism 6, due to the reaction force that acts on the linear motion mechanism 6, an axial load is applied to the flange member 40 in the direction toward the support member 41 so as to axially deflect the flange member 40 about the outer peripheral portion of the flange member 40. The deflection of the flange member 40 causes a change in the axial relative position between the magnetic target 42 and the magnetic sensor 43. This makes it possible to detect the load on the friction pad 5 based on the output signal of the magnetic sensor 43.

Thus, the electric motor 1 is actuated to control the braking force such that the difference between the above detected value and the target value (amount of depression of the brake pedal) is zero.

PATENT DOCUMENTS

Patent document 1: JP Patent Publication 06-327190A
Patent document 2: JP Patent Publication 2006-194356A In the above electric brakes, if a driver of the vehicle operates the brakes while the vehicle is at a stop (e.g. at a traffic light), the electric motor is actuated to reduce the difference between the target value corresponding to the brake operation and the detected value of the load detecting sensor to zero, in spite of the fact that the vehicle is at a stop. Since the output of the electric motor is given by "the number of revolutions multiplied by the torque", electric power is consumed, which deteriorates energy efficiency.

Especially in an electric brake using the above-described linear motion mechanism, in order to release the brake, it is necessary to disengage the friction pad, now pressed against the brake disk, from the brake disk by rotating the motor in reverse, instead of simply deactivating the motor. Thus, since electric power is consumed both when applying the brake and when releasing the brake, such unnecessary brake operation tends to extremely increase power consumption.

An object of the present invention is to prevent an increase in power consumption even if unnecessary brake operations are carried out.

SUMMARY OF THE INVENTION

In order to achieve this object, the present invention provides an electric brake system comprising an electric brake including a rotary shaft configured to be driven by an electric motor, a friction pad, a linear motion mechanism configured to convert the rotation of the rotary shaft to a liner motion of the friction pad, thereby pressing the friction pad against the brake disk, and a control means configured to receive a detection output of a load detecting means for detecting a load applied to the brake disk, a brake load command output from a brake pedal, and a detection output of a vehicle speed detecting means for detecting the vehicle speed, and to control the electric motor based on the outputs received. The control means is provided with a dead band within which a brake load applied by the linear motion mechanism does not change even if the load command output from the brake pedal is deviated from the detection output of the load detecting means, when it is detected that the vehicle is at a stop based on the detection signal of the vehicle speed detecting means.

In this arrangement, when it is detected that the vehicle is at a stop, the load command output from the brake pedal is compared with the detected load output of the load detecting means while the vehicle is at a stop. Even if the former is deviated from the latter, if the difference therebetween is within the dead band, the braking load is not changed when the brake pedal is operated. With this arrangement, it is possible to reduce power consumption due to unnecessary brake pedal operation after the vehicle has been brought to a stop.

Another dead band may be provided to be used while the vehicle is traveling such that this dead band has a width narrower than the dead band to be used while the vehicle is at a stop.

With this arrangement, it is possible to reduce power consumption due to unnecessary brake pedal operation, by providing a play in the brake operation using the dead band while the vehicle is traveling. In order to prevent a delay in brake operation, the dead band to be used while the vehicle is traveling has a width narrower than the dead band to be used while the vehicle is at a stop.

A timer means may be further provided for detecting the time period during which the vehicle is at a stop such that the width of the dead band is changed based on the time period during which the vehicle is at a stop.

With this arrangement, since the longer the time period during which the vehicle is at a stop, the more difficult it is for the driver to maintain the depressed position of the brake pedal, and more widely the brake pedal moves, it is possible to reduce power consumption by changing (e.g. by increasing) the width of the dead band so as to make it more difficult to actuate the brake by the operation of the brake pedal.

The vehicle speed detecting means may be wheel speed sensors provided at the vehicle wheels, or an acceleration sensor.

The control means may be further configured to determine that the vehicle is at a stop if the detection output of the vehicle speed detecting means for detecting the vehicle speed remains zero for a predetermined period of time.

With this arrangement, since it is determined that the vehicle is at a stop only after the vehicle speed remains zero for a predetermined time period, it is possible to stop the vehicle even if the wheels become locked up and the vehicle travels by inertia.

The linear motion portion of the linear motion mechanism may be any of a planetary roller mechanism, a ball-screw mechanism, a slide screw mechanism, or a ball-ramp mechanism. Any of the above-described electric brake systems can be used as a vehicle brake.

According to the present invention, it is possible to reduce power consumption of the electric brake system.

DETAILED DESCRIPTION OF THE INVENTION

Now referring to the drawings, an electric brake system embodying the present invention is described.

As shown in FIG. 1, the electric brake system of this embodiment includes an electric brake 2 driven by an electric motor 1, and a controller 3, and is configured to be mounted on vehicles (mainly four-wheel drive vehicles).

The electric brake 2 includes a caliper body 4, friction pads 5, and a linear motion mechanism 6.

As shown in FIG. 1, the caliper body 4 includes inner and outer portions 8 and 9 facing each other on both sides of a brake disk 7 which rotates together with a wheel, and coupled together through a bridge portion 10. The linear motion mechanism 6 is mounted in a mounting hole 11 formed in the inner portion 8.

The caliper body 4 is supported by a base member (not shown) fixed to a suspension (not shown) so as to be slidable in the axial direction of the brake disk 7 under a reaction force generated when the linear motion mechanism 6 is actuated.

The friction pads 5 comprise an outer pad 5a mounted to the outer portion 9 of the caliper body 4, and an inner pad 5b mounted to the linear motion mechanism 6 mounted in the inner portion 8.

Figure 2:
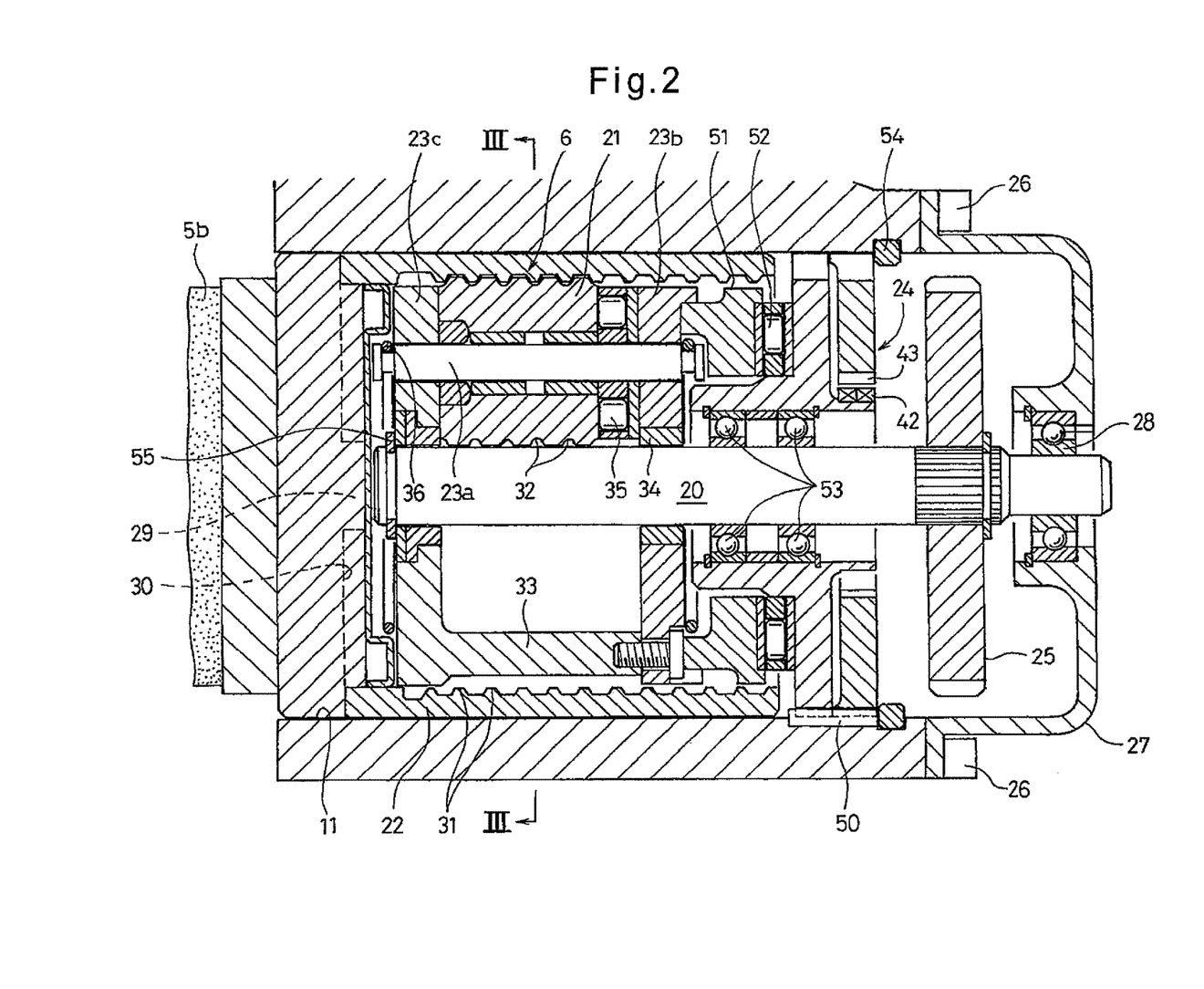
FIG. 2 is sectional view of a linear motion mechanism shown in FIG. 1.
Figure 3:
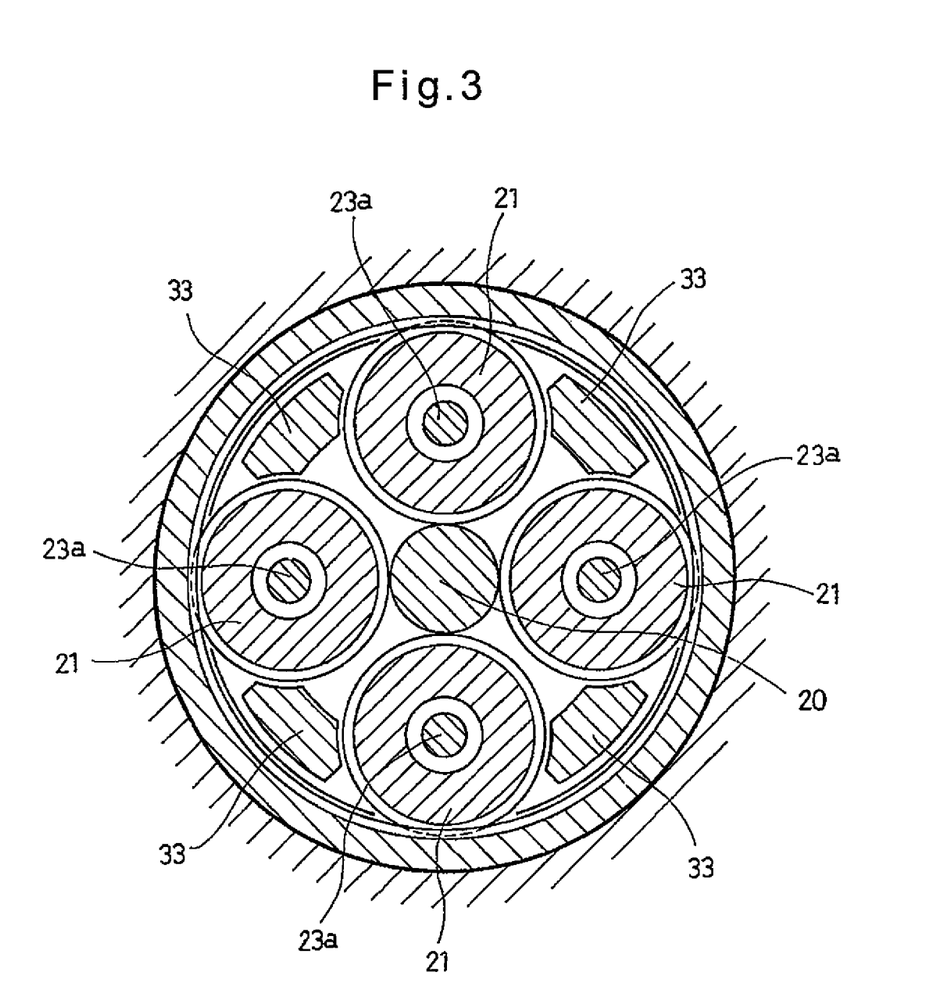
FIG. 3 is a sectional view taken along line III-III of FIG. 2.

As shown in FIGS. 2 and 3, the linear motion mechanism 6 includes a rotary shaft 20, a plurality of planetary rollers 21 kept in rolling contact with a cylindrical surface formed on the outer periphery of the rotary shaft 20, an outer ring member 22 surrounding the planetary rollers 21, and a carrier 23 supporting the planetary rollers 21 so as to be rotatable about their respective axes. The linear motion mechanism further includes a magnetic load sensor 24 arranged axially rearward of the outer ring member 22.

The rotary shaft 20 is connected to the electric motor 1 through a gear mechanism (not shown) such that the rotation of the electric motor 1 is transmitted to the rotary shaft 20 through a gear 25. The rotary shaft 20 is inserted in the mounting hole 11, which extends through the inner portion 8 of the caliper body 4, with one end thereof protruding from the axially rear opening of the mounting hole 11. The gear 25 is rotationally fixed to the protruding portion of the rotary shaft 20 by means of splines. The gear 25 is covered with a lid 27 fixed in position by bolts 26 to close the axially rear opening of the mounting hole 11. A bearing 28 is mounted in the lid 27 to rotatably support the rotary shaft 20.

As shown in FIG. 3, the planetary rollers 21 are arranged so as to be circumferentially spaced apart from each other, and kept in rolling contact with the cylindrical surface formed on the outer periphery of the rotary shaft 20, such that when the rotary shaft 20 rotates, the planetary rollers 21 rotate due to friction between planetary rollers 21 and the rotary shaft 20.

As shown in FIG. 2, the outer ring member 22 is mounted in the mounting hole 11, which is formed in the inner portion 8 of the caliper body 4, and axially slidably supported by the inner periphery of the mounting hole 11. The outer ring member 22 is formed, in its axially front end surface, with an engaging recess 30 in which is located an engaging protrusion 29 formed on the rear surface of the inner pad 5b. Due to the engagement of the engaging protrusion 29 in the engaging recess 30, the outer ring member 22 is rotationally fixed to the caliper body 4.

A helical rib 31 is formed on the inner periphery of the outer ring member 22. The helical rib 31 is engaged in circumferential grooves 32 formed in the outer periphery of each planetary roller 21. Thus, when the planetary rollers 21 rotate, the outer ring member 22 is moved in the axial direction with the helical rib 31 guided by the circumferential grooves 32. However, instead of the circumferential grooves 32, of which the lead angle is zero degrees, a helical groove having a different lead angle from the helical rib 31 may be formed in the outer periphery of each planetary roller 21.

The carrier 23 includes carrier pins 23a rotatably supporting the respective planetary rollers 21, an annular carrier plate 23c keeping constant the circumferential distances between the axial front ends of the respective adjacent carrier pins 23a, and an annular carrier body 23b keeping constant the circumferential distances between the axial rear ends of the respective adjacent carrier pins 23a. The carrier body 23b and the carrier plate 23c are opposed to each other with the planetary rollers 21 disposed therebetween, and are coupled together by coupling rods 33 disposed between the circumferentially adjacent planetary rollers 21.

The carrier body 23b is supported by the rotary shaft 20 through a slide bearing 34 so as to be rotatable relative to the rotary shaft 20. A thrust bearing 35 is mounted between each planetary roller 21 and the carrier body 23b to prevent the rotation of the planetary roller 21 about its axis from being transmitted to the carrier body 23b.

The carrier pins 23a, which are arranged circumferentially spaced apart from each other, are biased radially inwardly by ring springs 36 wrapped around the carrier pins 23s such that the ring springs 36 tend to be radially compressed. As a result, the outer peripheries of the planetary rollers 21 are pressed against the outer periphery of the rotary shaft 20 under the biasing force of the ring springs 36, preventing slippage between the rotary shaft 20 and the planetary rollers 21. In order to apply the biasing forces of the ring springs 36 over the entire axial lengths of the planetary rollers 21, the ring springs 36 are wrapped around the front axial ends and the rear axial ends, respectively, of the carrier pins 23a.

As shown in FIG. 4, the magnetic load sensor 24 includes a flange member 40 in the form of an annular plate, a support member 41 axially facing, while being axially spaced apart from, the flange member 40, a magnetic target 42 which generates a magnetic field, and a magnetic sensor element 43 configured to detect the intensity of a magnetic field.

Figure 5:
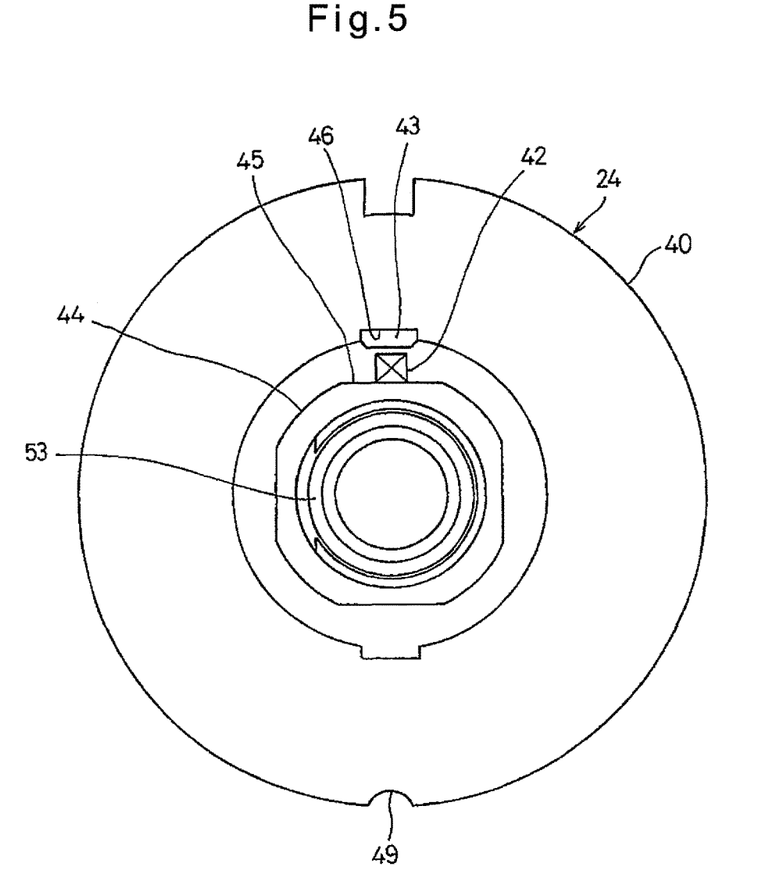
FIG. 5 is a front view of the sensor of FIG. 4, as assembled.

As shown in FIG. 5, the flange member 40 includes a tubular portion 44 extending into the support member 41 and having a radially outer surface radially facing the radially inner surface of the support member 41. The magnetic target 42 is fixed to a chamfer 45 formed on the radially outer surface of the tubular portion 44. The magnetic sensor element 43 is fixed in a groove 46 formed in the radially inner surface of the support member 41. The flange member 40 and the support member 41 are made of a magnetic material such as iron.

The support member 41 includes an annular wall 47 formed on the surface thereof facing the flange member 40. The annular wall 47 supports the radially outer portion of the flange member 40, keeping the flange member 40 and the support member 41 spaced apart from each other.

Figure 6:
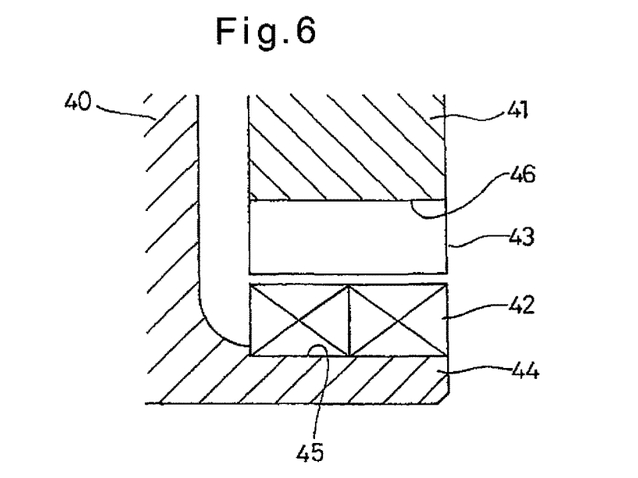
FIG. 6 is a partial enlarged sectional view of FIG. 5, showing a magnetic target.

As shown in FIG. 6, the magnetic target 42 includes two permanent magnets each radially magnetized so as to have magnetic poles at the radially inner and outer ends thereof, respectively, and arranged side by side with the N- and S-poles of one of the two permanent magnets axially aligned with the S- and N-poles of the other of the two permanent magnets, respectively.

The magnetic sensor element 43 comprises a Hall IC in the embodiment, but may be one other than a Hall IC, such as an MR sensor element or an MI sensor element.

The magnetic sensor element 43 is arranged so as to face the boundary between the two adjacent permanent magnets forming the magnetic target 42, or to face the vicinity of this boundary, in a direction perpendicular to the axis of the sensor (radial direction in the figures), so as to be in the same circumferential position.

The flange member 40 and the support member 41 of the magnetic load sensor 24 are formed, in their respective outer peripheries, with positioning grooves 48 and 49 having circular arc-shaped sections and arranged such that by fitting a key member 50 (see FIG. 2) in both positioning grooves 48 and 49, the flange member 40 and the support member 41 are circumferentially positioned relative to each other such that the circumferential positions of the magnetic target 42 and the magnetic sensor element 42 coincide with each other. In this magnetic load sensor 24, when a load acts on the flange member 40 in the axial direction toward the support member 41, such axial load axially deflects the flange member 40 about its outer peripheral portion. This changes the relative position between the magnetic target 42 and the magnetic sensor element 43, which in turn changes the output signal of the magnetic sensor element 43. Thus, if the relationship between the intensity of the axial load applied to the flange member 40 and the output signal of the magnetic sensor element 43 is known beforehand, it is possible to detect the intensity of the axial load applied to the flange member 40 based on the output signal of the magnetic sensor element 43.

In particular, as shown in FIG. 2, the magnetic load sensor 24 is fitted in the mounting hole 11 with the support member 41 positioned axially rearward of the flange member 40. Between the magnetic load sensor 24 and the carrier 23, there are mounted a spacer 51 which is configured to revolve around the rotary shaft 20 together with the carrier 23, and a thrust bearing 52 through which axial torque is transmitted between the spacer 51 and the magnetic load sensor 24. Rolling bearings 53 are mounted inside of the inner periphery of the flange member 40, rotatably supporting the rotary shaft 20.

A snap ring 54 fitted to the inner periphery of the mounting hole 11 engages the outer peripheral edge of the support member 41, preventing axial rearward movement of the magnetic load sensor 24. The magnetic load sensor 24 in turn prevents axial rearward movement of the carrier 23 by axially supporting the carrier body 23b through the spacer 51 and the thrust bearing 52. A snap ring 55 fitted to the axial front end of the rotary shaft 20 prevents axial forward movement of the carrier 23. The carrier 23 is therefore prevented from both axial forward and rearward movements, so that the planetary rollers 21, held by the carrier 23, are also prevented from both axial forward and rearward movements.

Figure 7:
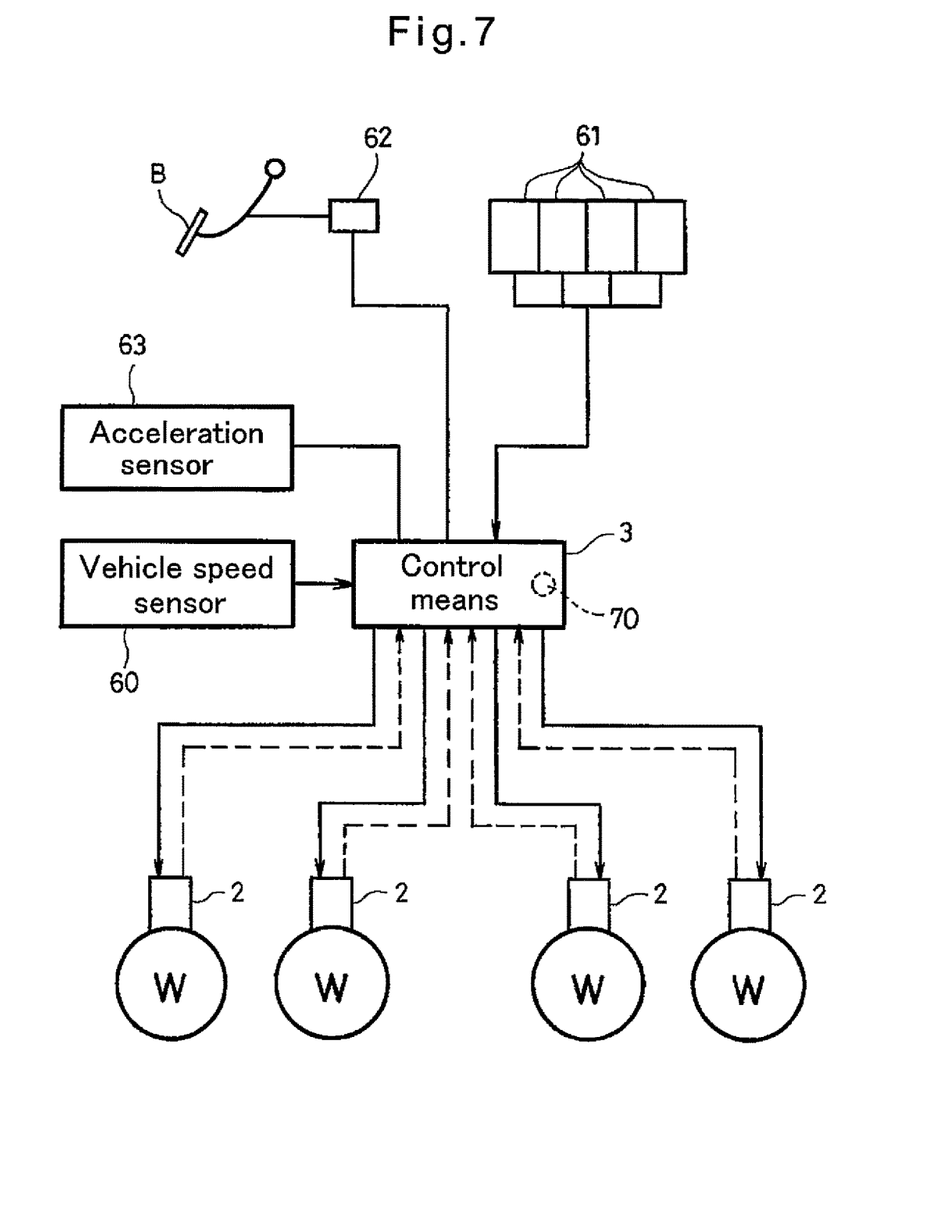
FIG. 7 is a block diagram of a control system of the embodiment of FIG. 1.

The controller 3 comprises an engine control unit (ECU) for brake control including a microcomputer. As shown in FIG. 7, to the controller 3 are connected a plurality of the electric brakes 2, a vehicle speed sensor 60, wheel speed sensors 61, a pedal sensor 62 and an acceleration sensor 63.

Thus, into the controller 3, brake loads are entered from the magnetic load sensors 24 of the electric brakes 2 for the respective wheels W, and a vehicle speed signal is entered from the vehicle speed sensor 60, which is calculated based on the number of revolutions of an axle. Also entered into the controller 3 are wheel speeds calculated based on the numbers of revolutions of the respective wheels W, the load command output from the pedal sensor 62 (which comprises a stroke sensor, a pressure sensor or the like), which is generated based on the amount of depression (stroke) of the brake pedal B and the pedal depressing pressure, and the output from the acceleration sensor 63, which is an element of an anti-lock control system (ABS). Based on these sensor outputs, the controller 3 controls a control output (operating variable) to be applied to the electric motors 1 of the brakes 2.

In this embodiment, when the brake pedal B is depressed while the vehicle is traveling, the amount of depression of the pedal is detected by the pedal sensor 62 and is entered into the controller 3 in the form of the load command output. Based on the pedal depressing amount in the form of the load command output and a change in the pedal depressing amount, the controller 3 calculates a control output corresponding to the brake operation, while also taking into consideration e.g., the direction in which the vehicle is traveling, which can be calculated from the vehicle speed detected by the vehicle speed sensor 60, and the wheel speeds detected by the wheel speed sensors 61. The control means 3 applies the thus calculated control output to the electric motors 1 of the electric brakes 2.

The control output actuates the electric motor 1 of each electric brake 2 to rotate the rotary shaft 20, which is coupled to the motor 1 through the gear mechanism. This causes the planetary rollers 21 to rotate about the respective carrier pins 23a while revolving around the rotary shaft 20. This in turn causes relative axial movement between the outer ring member 22 and the planetary rollers 21 due to engagement of the helical rib 31 in the circumferential grooves 32. However, since the carrier 23 and thus the planetary rollers 21 are prevented from axial movement, only the outer ring member 22 is actually moved in the axial direction, with the planetary rollers 21 remaining stationary in the axial direction. The linear motion actuator 6 thus converts the rotation of the rotary shaft 20, driven by the electric motor 1, to an axial linear motion of the outer ring member 22. As a result, the inner pad 5b is pressed against the brake disk 7 under an axial load applied from the outer ring member 22, thus generating a braking force.

A reaction force to the axial load is applied axially rearwardly to the outer ring member 22. The reaction force moves the caliper body 4 axially rearwardly through the planetary rollers 21, carrier 23, spacer 51 and thrust bearing 52, thus pressing the outer pad 5a mounted to the outer portion 9 of the caliper body 4 against the brake disk 7. The brake disk 7 is thus pressed by the outer pad 5a and the inner pad 5b from both sides.

The reaction force applied to the outer ring member 22 is simultaneously received by the magnetic load sensor 24. As a result, the flange member 40 of the magnetic load sensor 24 is deflected axially rearwardly, so that the relative position between the magnetic target 42 and the magnetic sensor element 43, which in turn correspondingly changes the output signal 42 of the magnetic sensor element 43. The output signal 42 is fed back to the controller 3, and the controller 3 controls the braking load so as to follow the depressing amount of the brake pedal B (load command output) as shown by a in FIG. 8(a).

After the brakes have been applied in the above manner, the controller 3 detects that the vehicle has been brought to a stop based on the output from the vehicle speed sensor 60 as a vehicle speed detecting means, and/or the outputs from the wheel speed sensors 11 as another vehicle speed detecting means. For safety's sake, the controller 3 is preferably configured to determine that the vehicle has stopped after a zero vehicle speed has been detected for a predetermined period and thus inertia has disappeared after the vehicle has actually stopped.

In the embodiment, as the speed detecting means, the vehicle speed sensor 60 and/or the wheel speed sensors 61 are used. However, instead of these sensors 60 and 61, the vehicle speed may be detected by integrating the output from the acceleration sensor 63 of the ABS. With this arrangement, the vehicle speed can be detected not from the rotation of the wheels or an axle, but from the acceleration of the vehicle, and it is thus possible to determine that the vehicle has stopped by detecting that the acceleration has decreased to zero. It is therefore possible to shorten the above predetermined time period during which a zero vehicle speed is detected.

Figure 8:
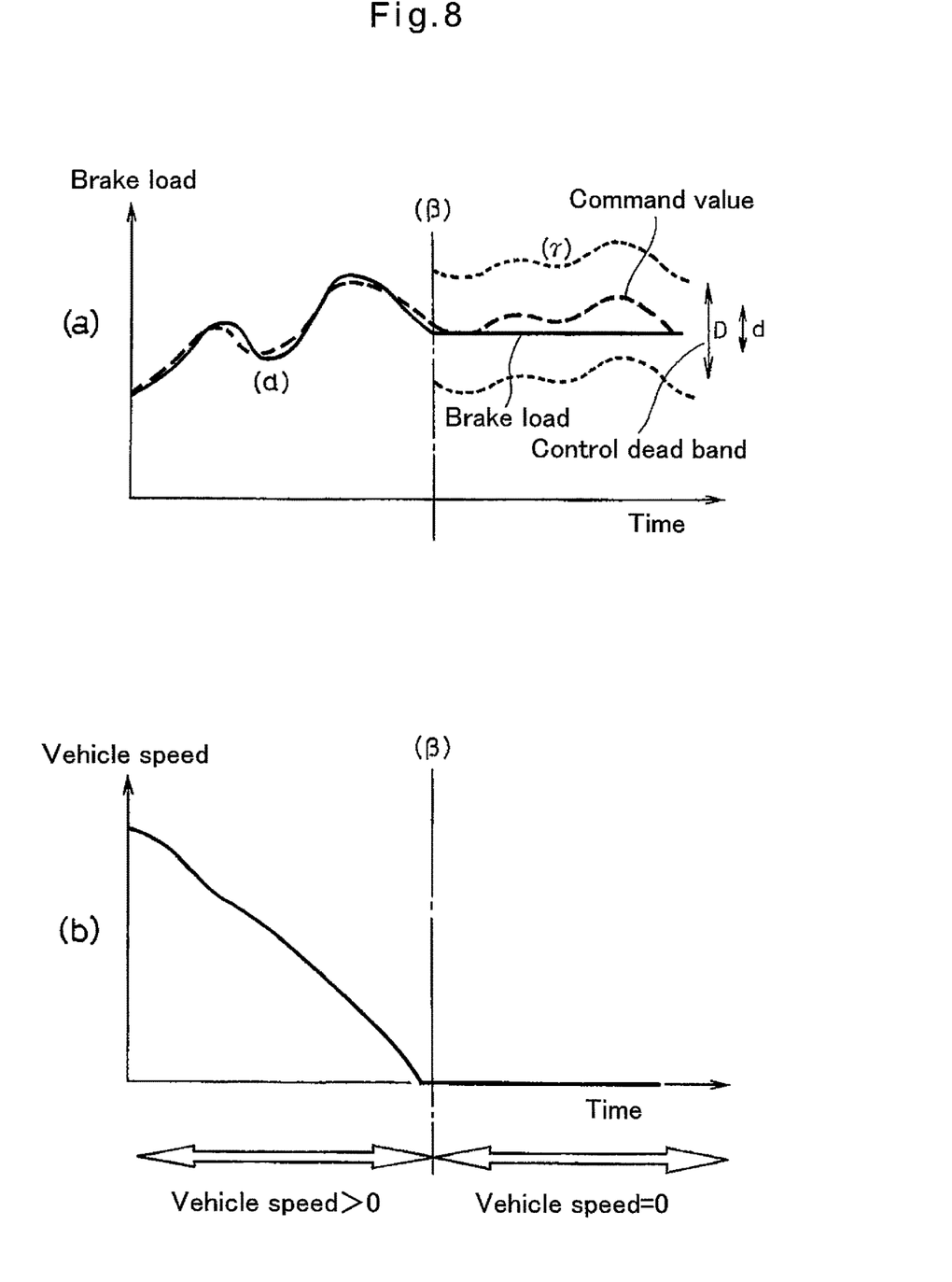
FIGS. 8(a) and 8(b) show how the embodiment operates.

When the controller 3 detects that the vehicle has stopped, it changes the control output (operating variable) of the electric motor 1, as shown by y in FIG. 8.

That is, when the controller 3 detects that the vehicle has stopped, the controller 3 memorizes the depressed amount of the brake pedal B. Specifically, the controller 3 temporarily memorizes the load command output from the pedal sensor 62, and maintains the braking load corresponding to the depressed amount of the brake pedal. The controller then uses output properties in which a dead band D is provided which is a range of load command output above and below a set value which is a load command output of the brake pedal B corresponding to the maintained braking load and in which the control output does not change with the load command output of the brake pedal B. The dead band D can be realized easily by processing the program because the output properties can be changed in a stepwise manner by adding or subtracting a constant to or from the central value.

Thus, by providing such a dead band D, while the vehicle is at a stop only by depressing the brake pedal B (and not using the parking brake), e.g. at a traffic light or at a railway crossing, even if the driver unintentionally loosens or additionally depresses the brake pedal B, the braking load will not change.

That is, even if the load command output from the brake pedal B deviates from the braking load from the magnetic load sensor 24 of each electric brake 2 as a result of loosening or additional depression of the brake pedal B, provided the deviation is within the predetermined range (dead band), the controller does not change the braking load. Thus, even if the brake pedal is unnecessarily operated while the vehicle is at a stop, the electric motors 1 will not be actuated.

Especially in an electric brake 2 as described above, which uses the linear motion mechanism 6, in order to release the brake 2, it is necessary not only to stop the electric motor 1 but also to reverse the electric motor 1, thereby disengaging the friction pad 5 from the brake disk 7. Thus, by applying the present invention, which prevents actuation of the electric motor 1 due to unnecessary brake operation, to such an electric brake, it is possible to reduce power consumption.

While the dead band D is provided, if a large braking load is necessary while the vehicle is at a stop, such large braking load can be generated by depressing the brake pedal B hard such that the load command output of the brake pedal B overshoots the dead band D. Conversely, by releasing the brake pedal B, since the load command output of the brake pedal B falls below the dead band D, the brakes can be released. Thus, by determining the width of the dead band D such that the above states are possible within the operation range of the brake pedal B, the dead band will not interfere with normal braking operation.

Example 1

Example 1, in which the dead band D is used while the vehicle is traveling, is described with reference to FIG. 8(a).

In this case, the controller uses a dead band d to be used while the vehicle is traveling when the controller detects that the vehicle is traveling based on the output from the vehicle speed sensor 60 as a vehicle speed detecting means, and/or the outputs from the wheel speed sensors 61 as another vehicle speed detecting means. The dead band d while the vehicle is traveling is set using the load command output when the depressed amount of the brake pedal B becomes constant. It is possible to detect this constant output by holding the peak of the load command output (a peak hold circuit may be used for this purpose).

In this electric brake system, even if the brake pedal B is not operated properly for decelerating the vehicle, since no control output is applied to the electric brakes 2, it is possible to prevent unnecessary actuation.

Thus, the dead band d used while the vehicle is traveling is not configured to absorb large strokes of the brake pedal when the brake pedal is unintentionally loosened or additionally depressed, as with the dead band D used while the vehicle is at a stop, and if the dead band d is not configured to absorb only small strokes during deceleration, there may be a delay in brake operation.

Thus, as shown in FIG. 8(a), the dead band d used while the vehicle is traveling has to be narrower in width (range) than the dead band D while the vehicle is at a stop. The width of the dead band d is determined by experiments or based on experience.

By performing control using a dead band while the vehicle is traveling, it is possible to reduce power consumption by reducing unnecessary brake operation.

When the control means detects that the vehicle has stopped based on the output of the vehicle speed sensor 60 as a vehicle speed detecting means, and/or the outputs of the wheel speed sensors 61 as another vehicle speed detecting means, processing using the dead band D described in the embodiment is carried out.

Example 2

In Example 2, the dead band is controlled by measuring the time period during which the vehicle is at a stop. Thus, the controller 3 includes a timer means 70 shown by broken line in FIG. 7. The timer means 70 measures the time period during which the vehicle is at a stop, and is configured to start measuring time when the controller 3 detects that the vehicle has been brought to stop based on the vehicle speed sensor 60, the wheel speed sensors 61 and/or the acceleration sensor 63.

After starting measuring time, the timer means 70 outputs time-up signals at predetermined time intervals. Every time a time-up signal is generated, the controller 3 increases the width of the dead band D by a predetermined value, to cope with the fatigue of the operator.

That is, the longer the time period during which the operator is depressing the brake, the more the operator tends to become fatigued, so that the brake pedal B tends to be moved more markedly. Corresponding to such increase in movement of the brake pedal, the width of the dead band D is increased. How much and at what timing the width of the dead band D is increased is determined in an appropriate manner. As a result, it is possible to reduce unnecessary braking operation and thus reduce power consumption. Needless to say, there is an upper limit above which the width of the dead band cannot be increased.

Example 3

In Example 3, control is carried out more accurately corresponding to the braking operation of the operator by taking into consideration the "play" of the brake pedal B (as well as the distance of the brake pedal to the floor when the brake pedal is depressed to the limit).

The "play" of the brake pedal is considered to be a mechanical dead band of the brake pedal B. The "play" of the brake pedal of each vehicle slightly differs from those of other vehicles due to pedal adjustments of the respective vehicles. This could cause a difference between the operation of the brake pedal B and the braking behavior.

Therefore, description is now made of how the "play" of the brake pedal B is detected and reflected in the control of the electric brakes 2.

As means for detecting the play of the brake pedal B, the pedal sensor 62 and the magnetic load sensor 24 of each electric brake 2 are used.

In particular, when the brake pedal B is operated, and the magnetic load sensors 24 detect the actuation of the electric brakes, it is possible to detect the "play" by subtracting the pedal stroke when the operation is started from the pedal stroke at that time.

Thus, by controlling the width of the dead band D based on the thus detected "play", the control means 3 can eliminate the difference due to the "play" of the brake pedal B. Thus, by eliminating any unnecessary brake operation due to this difference, it is possible to reduce power consumption.

Example 4

Example 4 is directed to a different type of linear motion mechanism 6 used in each electric brake.

Figure 9:
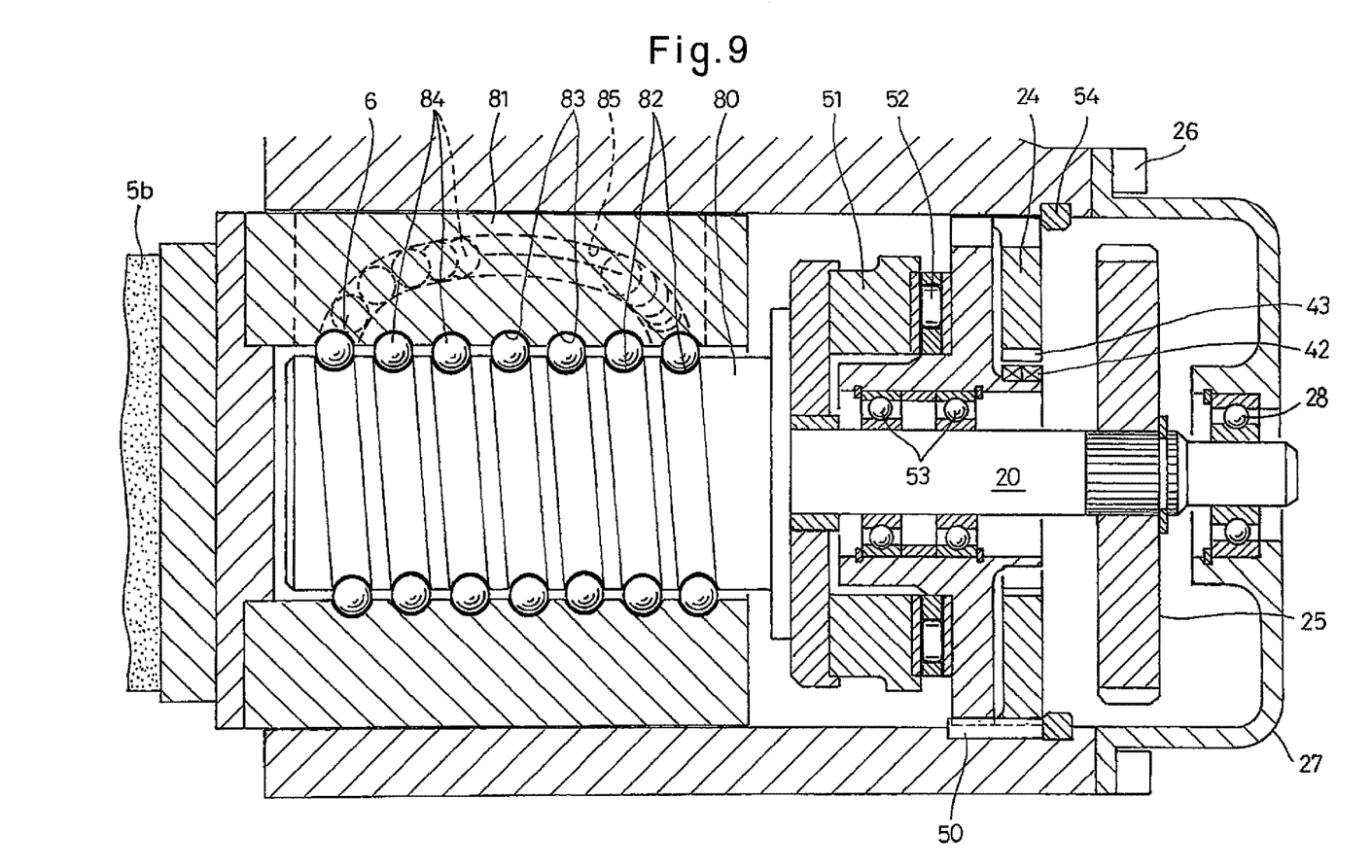
FIG. 9 is a sectional view of a different linear motion mechanism in Example 4.

FIG. 9 shows a ball-screw mechanism as the linear motion mechanism 6, which includes a threaded shaft 80 integral with the rotary shaft 20, a nut 81 surrounding the threaded shaft 80, and a plurality of balls 84 disposed between a thread groove 82 formed in the outer periphery of the threaded shaft 80 and a thread groove 83 formed in the inner periphery of the nut 81. This linear motion mechanism 6 further includes a return tube 85 for returning the balls 84 from the end point to the starting point, of the thread groove 83 of the nut 81 so as to surround the balls 84, and the magnetic load sensor 24, which is disposed axially rearwardly of the nut 81.

This linear motion mechanism 6 is configured such that when the rotary shaft 20 is rotated, the threaded shaft 80 and the nut 81 are rotated relative to each other such that the nut 81 moves axially forward, thus applying an axial load to the inner pad 5b. At this time, an axially rearward reaction force acts on the threaded shaft 80. The reaction force is then transmitted to the magnetic load sensor 24 through the spacer 51 and the thrust bearing 52. Under this reaction force, the flange member 40 of the magnetic load sensor 24 is axially rearwardly deflected, thus changing the relative position between the magnetic target 42 and the magnetic sensor unit 43. As a result, the output signal of the magnetic sensor unit 43 changes according to the intensity of the axial load applied to the inner pad 5b, so that it is possible to detect the pressure applied to the inner pad 56 based on the output signal of the magnetic sensor 43.

Figure 10:
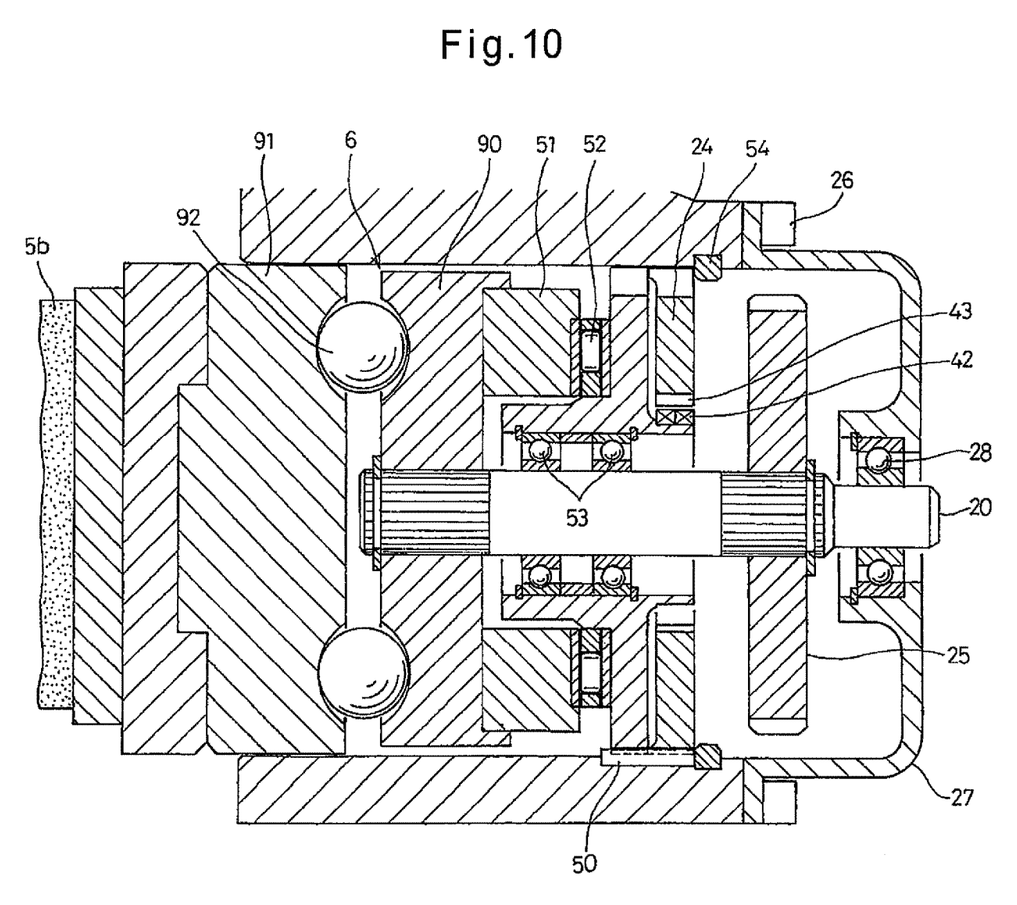
FIG. 10 is a sectional view of a still different linear motion mechanism in Example 4.

The linear motion mechanism 6 shown in FIG. 10 is a ball-ramp mechanism including a rotary disk 90 rotationally fixed to outer periphery of the rotary shaft 20, a linear motion disk 91 located axially forwardly of and axially facing the rotary disk 90, and a plurality of balls 92 disposed between the linear motion disk 91 and the rotary disk 90. This linear motion mechanism further includes the magnetic load sensor 24, which is provided axially rearwardly of the linear motion disk 91.

This linear motion mechanism 6 is configured such that when the rotary shaft 20 is rotated, the linear motion disk 91 and rotary disk 90 are rotated relative to each other such that the linear motion disk 91 moves axially, thus applying an axial load to the inner pad 5b.

At this time, an axially rearward reaction force acts on the rotary disk 90. The reaction force is then transmitted to the magnetic load sensor 24 through the spacer 51 and the thrust bearing 52. Under this reaction force, the flange member 40 of the magnetic load sensor 24 is axially rearwardly deflected, thus changing the relative position between the magnetic target 42 and the magnetic sensor unit 43. As a result, the output signal of the magnetic sensor unit 43 changes according to the intensity of the axial load applied to the inner pad 5b, so that it is possible to detect the pressure applied to the inner pad 5b based on the output signal of the magnetic sensor 43.

Figure 11:
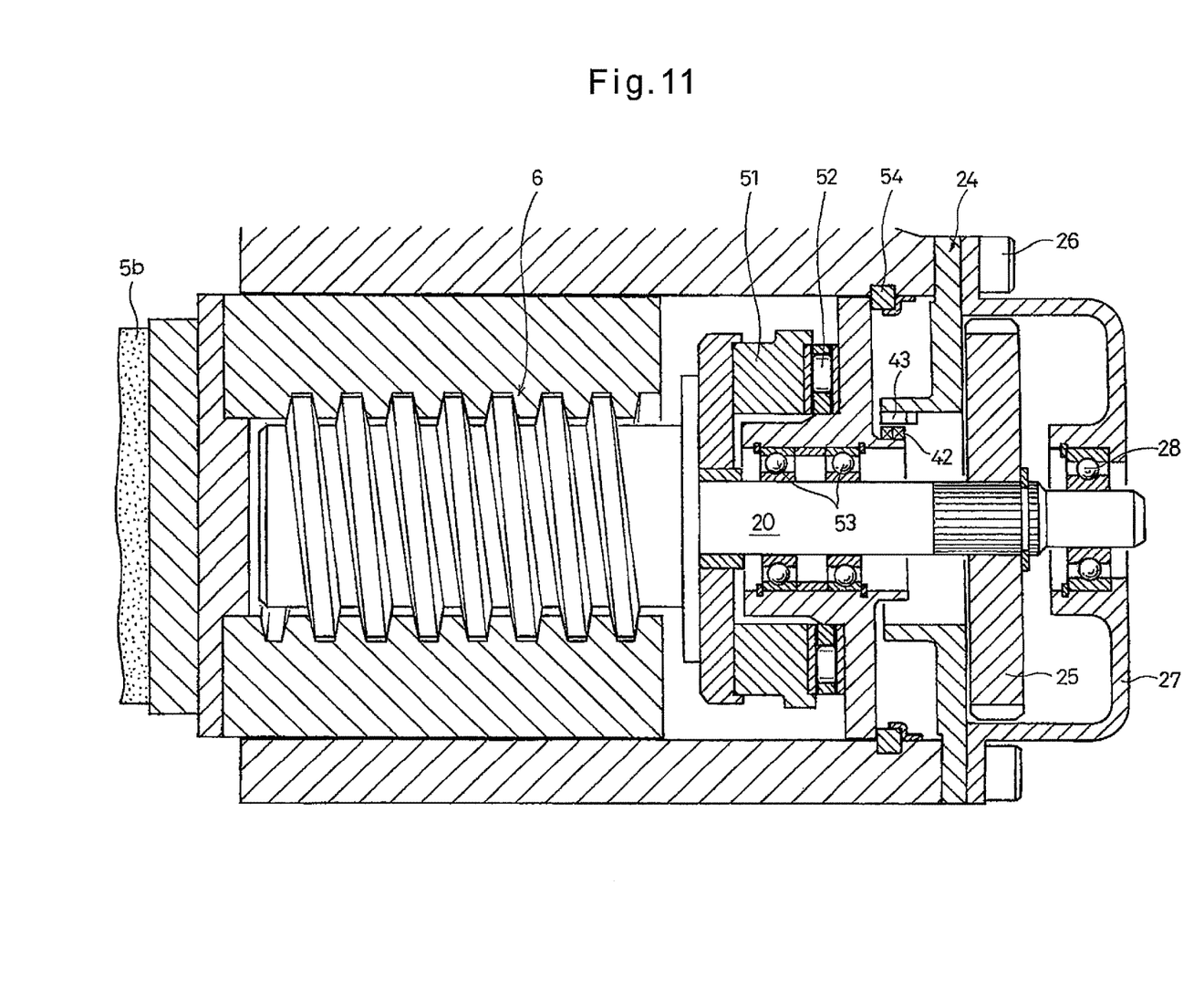
FIG. 11 is a sectional view of a further different linear motion mechanism in Example 4.

The linear motion mechanism 6 shown in FIG. 11 is a slide screw mechanism, which differs from the ball-screw mechanism of FIG. 9 in that a trapezoidal screw is used as a ball-screw. Otherwise, this linear motion mechanism is identical to that shown in FIG. 9, and its description is omitted.

Such a slide screw mechanism can be advantageously used for a vehicle brake, which is used under high loads and which is vertically vibrated.

DESCRIPTION OF THE NUMERALS

1. Electric motor
2. Electric brake
3. Control means
5. Friction pad
6. Linear motion mechanism
7. Brake disk
20. Rotary shaft
24. Magnetic load sensor
60. Vehicle speed sensor
61. Wheel speed sensor
62. Pedal sensor
63. Acceleration sensor
70. Timer means
B. Brake pedal
D. Dead band

What is claimed is:

1. An electric brake system comprising:
    an electric brake including a rotary shaft configured to be driven by an electric motor;
    a friction pad;
    a brake disk;
    a linear motion mechanism configured to convert a rotation of the rotary shaft to a linear motion of the friction pad so as to press the friction pad against the brake disk;
    a timer for detecting a time period during which a vehicle is at a stop; and
    a controller configured to receive:
        a brake load detection output from a load detecting unit indicating a brake load applied to the brake disk,
        a brake load command output from a brake pedal, and
        a speed detection output from a vehicle speed detecting unit indicating a vehicle speed;
    wherein the controller is further configured to control the electric motor driving the rotary shaft of the electric brake based on the brake load detection output, the brake load command output, and the speed detection output, and so as to have a dead band, the dead band being a range of brake load command outputs within which the controller does not change the brake load applied to the brake disk by the linear motion mechanism even if the brake load command output from the brake pedal deviates from the brake load detection output from the load detecting unit by an amount within the dead band, when it is detected that a vehicle is at a stop based on the speed detection output from the vehicle speed detecting unit; and
    wherein the controller is further configured to adjust a width of the dead band such that, the longer the time period detected by the timer, the larger the width of the dead band.

2. The electric brake system of claim 1, wherein the controller is configured to have the dead band when it is detected that a vehicle is moving based on the speed detection output from the vehicle speed detecting unit.

3. The electric brake system of claim 1, further comprising a play detecting unit for detecting a play of the brake pedal, wherein the controller is further configured to change a width of the dead band based on the play detected by the play detecting unit.

4. The electric brake system of claim 1, wherein the vehicle speed detecting unit comprises a wheel speed sensor mounted to a vehicle wheel.

5. The electric brake system of claim 1, wherein the vehicle speed detecting unit comprises an acceleration sensor.

6. The electric brake system of claim 1, wherein the controller is configured to determine that the vehicle is at a stop if the speed detection output from the vehicle speed detecting unit remains zero for a predetermined period of time.

7. The electric brake system of claim 1, wherein the controller is configured to control the electric motor to drive the rotary shaft of the electric brake when the brake load command output is above an uppermost brake load command output of the range of brake load command outputs of the dead band.

* * * * *